US009851935B1

(12) United States Patent
Cohen et al.

(10) Patent No.: US 9,851,935 B1
(45) Date of Patent: Dec. 26, 2017

(54) COMPUTER-CONTROLLED SIDEWALK TILES

(71) Applicant: Microsoft Technology Licensing, LLC, Redmond, WA (US)

(72) Inventors: Avichai Cohen, Givat Shmuel (IL); Yuval Pinchas Borsutsky, Rishon Le-zion (IL); Keren Damari, Tel Aviv (IL); Benny Schlesinger, Ramat Hasharon (IL); Nir Levy, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/341,199

(22) Filed: Nov. 2, 2016

(51) Int. Cl.
| A63F 13/25 | (2014.01) |
| A63F 13/30 | (2014.01) |
| G06F 3/14 | (2006.01) |
| G09G 5/00 | (2006.01) |
| A63F 13/21 | (2014.01) |
| G08G 1/005 | (2006.01) |

(52) U.S. Cl.
CPC ............ G06F 3/1423 (2013.01); A63F 13/21 (2014.09); A63F 13/25 (2014.09); A63F 13/30 (2014.09); G09G 5/006 (2013.01); G08G 1/005 (2013.01)

(58) Field of Classification Search
CPC .......... A63F 13/25; A63F 13/30; G08G 1/005
USPC ......................... 345/418, 419, 522; 715/700
See application file for complete search history.

(56) References Cited

U.S. PATENT DOCUMENTS

| 6,731,940 | B1 | 5/2004 | Nagendran |
| 7,495,631 | B2 | 2/2009 | Bhakta et al. |
| 7,584,269 | B2 | 9/2009 | Moore et al. |
| 7,831,379 | B2 | 11/2010 | Nathan et al. |
| 8,254,338 | B2 | 8/2012 | Anschutz et al. |
| 2001/0054066 | A1 | 12/2001 | Spitzer |
| 2007/0024580 | A1 | 2/2007 | Sands et al. |
| 2007/0188483 | A1 | 8/2007 | Bonner |
| 2009/0113775 | A1 | 5/2009 | Netter |
| 2010/0167704 | A1 | 7/2010 | Villemaire |
| 2016/0131486 | A1 | 5/2016 | Hendrix |

OTHER PUBLICATIONS

Kaminagai, Yo, "The RATP Osmose bus station demonstrator, for the EBSF project (19743)", In Proceedings of Transport Research Arena, Apr. 14, 2014, pp. 1-10.

(Continued)

*Primary Examiner* — Jacinta M Crawford
(74) *Attorney, Agent, or Firm* — Jared S. Goff; Goff Patent Law, PLLC

(57) ABSTRACT

Command instruction data can be generated via a computerized control system, with the instruction data being formatted to prompt a plurality of tile units to change their output. The instruction data can be sent from the control system to the tile units, with each of the tile units including a tile controller connected to one or more tiles embedded in one or more sidewalk floors, and with each of the tiles including a user interface output device. At least part of the instruction data from the control system can be received via a tile controller of a tile unit. At least part of the instruction data can be processed via the tile controller. In response, the user interface output device of the tile can be signaled via the tile controller to change the output of the output device.

20 Claims, 4 Drawing Sheets

(56) References Cited

OTHER PUBLICATIONS

Costa, et al., "Fiducials Marks detection to Assist Visually Impaired people Navigation", In International Journal of Digital Content Technology and its Applications, vol. 5, Issue 5, May 2011, 7 pages.
Halfawy, et al., "Review of Commercial Municipal Infrastructure Asset Management Systems", In Electronic Journal of Information Technology in Construction, vol. 11, Jan. 1, 2006, 17 pages.
Aleleo, "New York moves forward in its transformation as a smart city with the largest WiFi network in the world in digital totem", digitalavmagazine.com, Jan. 13, 2015, 6 pages.

COMPUTER-CONTROLLED SIDEWALK TILES

BACKGROUND

Sidewalks are used by pedestrians and bicyclists in many settings. Such sidewalks may be along city streets, within indoor and/or outdoor shopping malls, in parks, in train stations, in bus stations, in airports, and in other areas. As used herein the sidewalk floor refers to the actual floor surface of a sidewalk upon which users tread during walking, running, cycling, skating, skateboarding, etc.

SUMMARY

The tools and techniques discussed herein relate to computer-controlled sidewalk tiles, which are embedded in a sidewalk, so that the tiles themselves are configured to be treaded upon during normal sidewalk use. Each such computer-controlled tile can provide computerized output, such as via a computer display and/or a computer-controlled speaker.

In one aspect, the tools and techniques can include generating command instruction data via a computerized control system, with the command instruction data being formatted to prompt a plurality of computerized tile units to change their output. The command instruction data can be sent from the computerized control system to the computerized tile units, with each of the tile units including a tile controller connected to one or more tiles embedded in one or more sidewalk floors, and with each of the tiles including a user interface output device. At least part of the command instruction data from the computerized control system can be received via a tile controller of a tile unit of the one or more tile units. At least part of the command instruction data can be processed via the tile controller. In response to the processing of the at least part of the command instruction data, the user interface output device of the tile can be signaled via the tile controller to change the output of the output device. The output of the user interface output device of the tile can be changed in response to the signaling from the tile controller.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
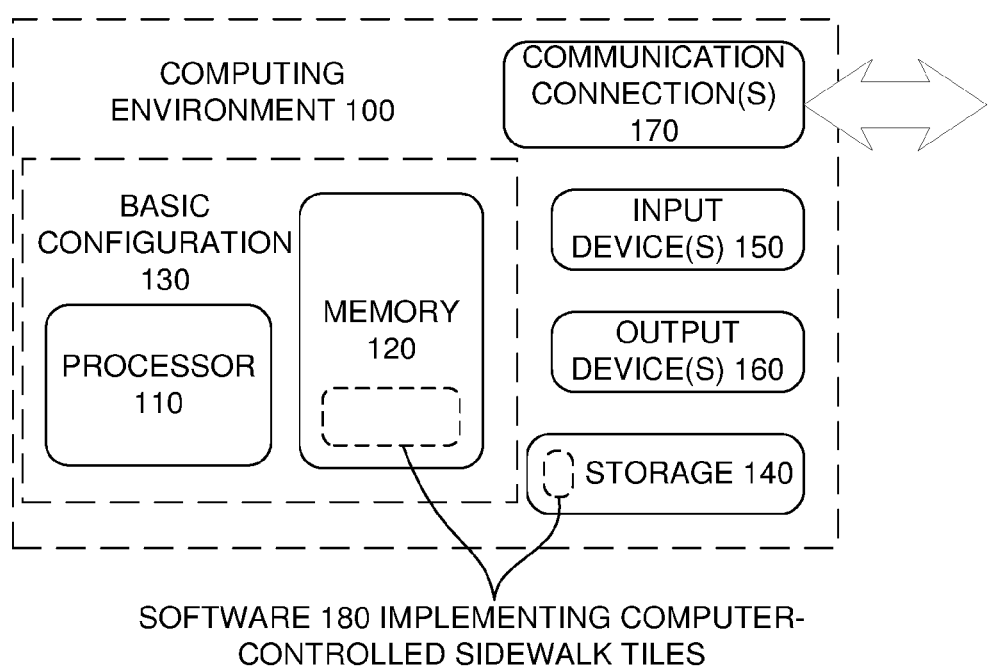
FIG. 1 is a block diagram of a suitable computing environment in which one or more of the described aspects may be implemented.

Aspects described herein are directed to techniques and tools for improved utilization of sidewalks using computer-controlled sidewalk tiles embedded in sidewalk floors. Such improvements may result from the use of various techniques and tools separately or in combination.

Such techniques and tools may include a control system as well as computer-controlled tiles, with the tiles being embedded in sidewalk floors, and with the tiles being controlled by the control system. The sidewalk floors may be for sidewalks in areas such as those mentioned above in the Background section. Such a system may enable sidewalk managers such as municipalities to designate in real time the use of sidewalks using computer-controlled displays and speakers embedded in the tiles themselves. This allows the managers to utilize the tiles as a manageable resource. For example, the tiles may be used to allocate lanes for control of sidewalk traffic, such as dictating pedestrians vs bike riders, controlling the direction of the traffic, or other sidewalk traffic controls. Thus managers of the sidewalk can dynamically manage usage of a sidewalk throughout the day. For example, the system may change the output of the tiles to dictate movement in different directions at different times of day for sidewalk lanes (which may be an entire sidewalk or a portion of a sidewalk).

The computer-controlled tiles can also be used for other applications, such as games or artistic displays. The tiles can also include sensors, and can provide telemetry data from the sensors. For example, the tiles can be used to display personalized data in response to sensing the proximity of a specific person, or a person that belongs to a particular group. For example, a sensor may sense that a particular blind user is nearby (such as where data in a user profile, which is accessed by the control system, indicates the user is blind), and may respond by providing audible navigation directions that are specific to that blind user.

Accordingly, one or more substantial benefits can be realized from the computer-controlled sidewalk tile tools and techniques described herein. For example, such tools and techniques can provide additional functionality for sidewalks, such as presenting useful computer output (such as visual or audio output) to sidewalk users. Also, the sidewalk tiles may be used to dictate more efficient uses of the sidewalks at different times, such as by giving priority to a particular type of user or to users moving along the sidewalk in a particular direction.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a tile controller, a computer device in a tile control system, an administrator client device, and/or a computer device in a data service. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing computer-controlled sidewalk tiles. An implementation of computer-controlled sidewalk tiles may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Computerized Sidewalk Tile System

Figure 2:
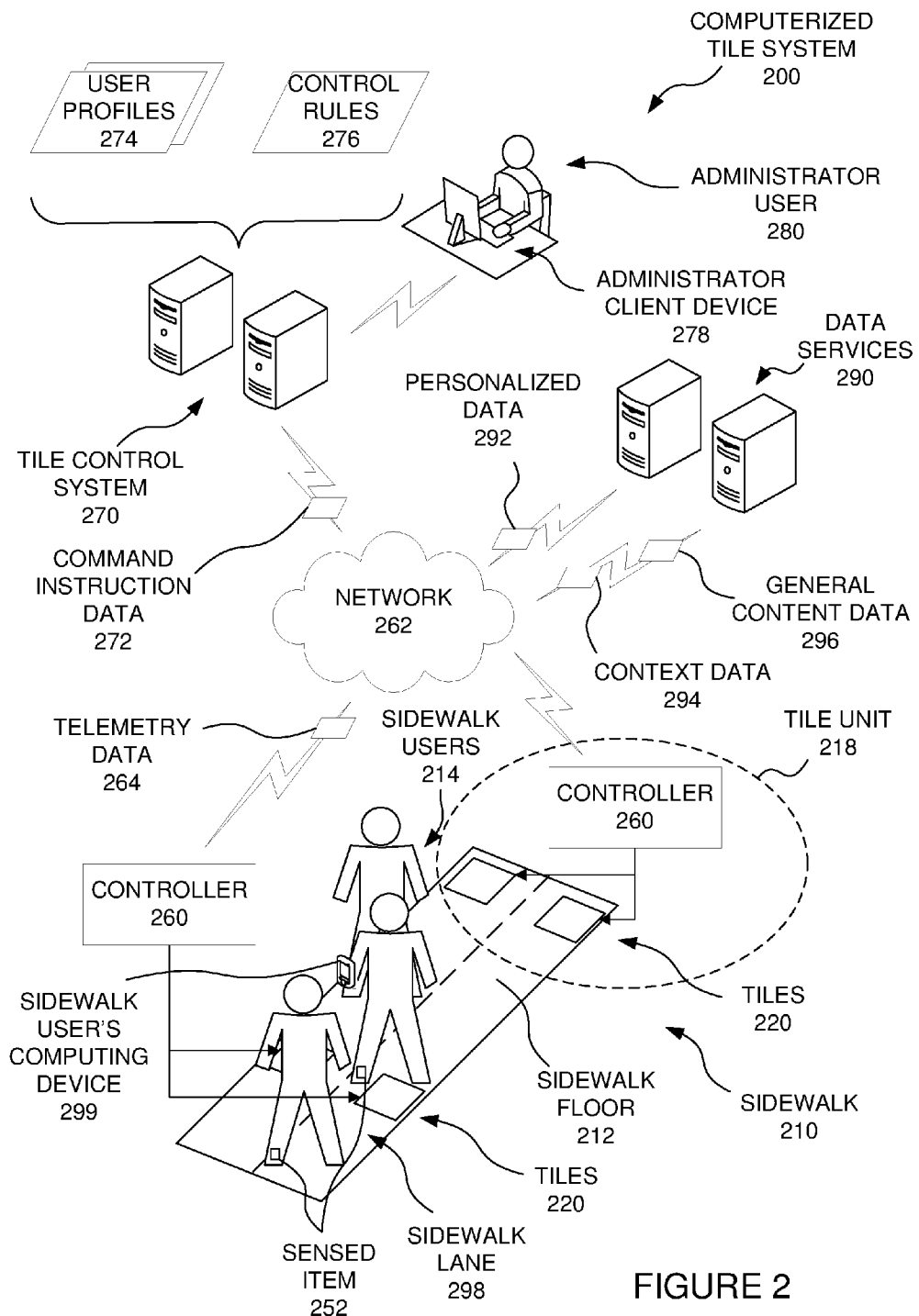
FIG. 2 is a schematic diagram of a computerized sidewalk tile system.

FIG. 2 is a schematic diagram of a computerized sidewalk tile system (200) in conjunction with which one or more of the described aspects may be implemented.

Communications between the various devices and components discussed herein, such as with reference to FIGS. 2 and/or 3, can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

A. Computerized Sidewalk Tile System Components

Referring now to FIG. 2, components of the computerized sidewalk tile system (200) will be discussed. Each of the components includes hardware, and may also include software. For example, a component of FIG. 2 or FIG. 3 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

Figure 3:
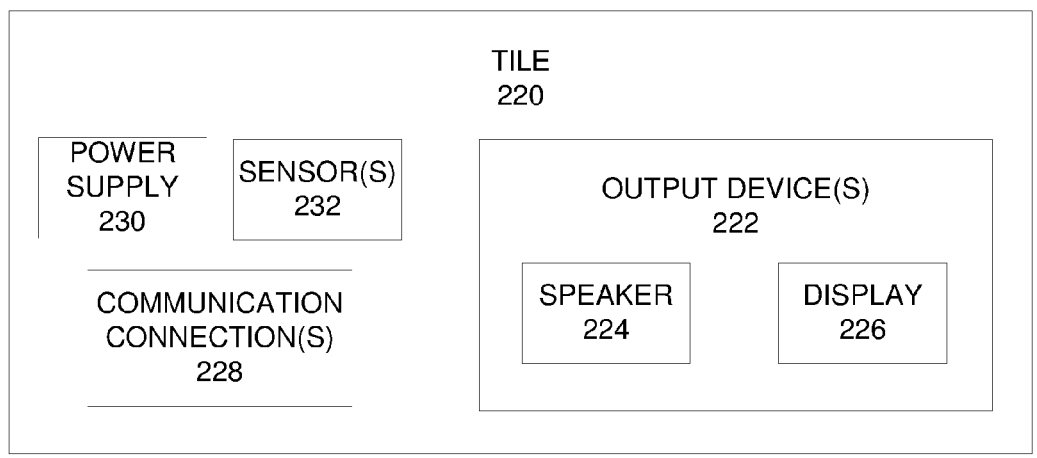
FIG. 3 is a block diagram of a computer-controlled sidewalk tile.

The computerized tile system (200) can include a sidewalk (210). The sidewalk (210) can include a sidewalk floor (212), upon which sidewalk users (214) can tread. The sidewalk (210) may also include other features that are not intended for treading upon, such as railings, benches, etc. The computerized tile system (200) can also include tile units (218). Each tile unit (218) can include one or more computer-controlled tiles (220) embedded in the sidewalk floor (212), so that the tiles (220) are part of the sidewalk floor (212), with the tiles being designed to be treaded upon by users (214), such as pedestrians, bicyclists, or other sidewalk users. For example, each tile (220) may include an upper surface that forms part of an upper surface of the sidewalk floor (212). Referring to FIG. 3 and still to FIG. 2, each tile (220) can include one or more user interface output devices (222), such as a speaker (224) and/or a display (226). For example, a display (226) may include an array of distinct separated light-emitting diodes (LED's). Alternatively, the display (226) may be some other type, such as a continuous LED computer display screen, or a liquid crystal display screen. The tile (220) may also include other components, such as one or more communication connections (228), a power supply (230), and one or more sensors (232).

Through the communication connection (228), a tile (220) can communicate with a tile controller (260), which can also be part of the tile unit (218). Thus a tile unit (218) can include a tile controller (260) and one or more tiles (220). The communications between each tile (220) and the controller (260) may be through wired and/or wireless communication signals configured according to computer communication protocols.

The power supply (230) for each tile may be a self-contained power supply and/or a power supply that receives power from an outside source. For example, a tile power supply (230) may include a solar panel and a battery that is connected to the solar panel, so that the power supply can be self-contained. As another option, a tile power supply (230) may be a connection to a municipal power grid, such as a grid that supplies alternating current power. The power supply (230) may incorporate one type of supply as a primary power supply, with another as a backup power supply.

Each of the power supply (230), the one or more sensors (232), and the controller (260) for a tile (220) may be located within the tile (220) and/or outside the tile (220). Also, each of these components may be used for a single tile (220) and/or for a group of tiles (220). For example, as illustrated in FIG. 2, each controller (260) controls a group of multiple tiles (220). However, each tile (220) could have its own controller, and such a controller could be located within the tile (220) itself. Similarly, FIG. 3 illustrates the sensor(s) (232) for a tile (220) being located within the tile. However, the sensor(s) (232) for a tile (220) may be located outside of the tile (220) (such as incorporated into the sidewalk (210) near the tile (220)). Also, a sensor (232) or group of sensors (232) may provide sensing capability for a group of nearby tiles (220). Likewise, all or part of the components of a power supply (230) for a tile (220) may be located within the tile (220) and/or outside the tile (220), and at least some such components may be utilized to supply power for multiple tiles (220) and/or associated controllers (260).

Each controller (260) can include hardware such as memory, one or more processors, and communication connections through which the controller (260) can communicate through a computer network (262) with a tile control system (270). Each controller (260) may run software and/or may have processing instructions embodied in dedicated hardware logic. The network (262) may be a single dedicated line between each controller (260) and the control system (270), or it may be some other type of wired and/or wireless network with shared network routing components through which packets of data can be transmitted between the controller (260) and the control system (270).

Each tile (220) can include a housing to protect the other components of the tile (220). Such a housing may be sealed so that the tile (220) is weather-resistant. For tiles with visual displays, the housing may include a clear cover for the visual display. Such a cover can form a portion of the upwardly-facing surface of the sidewalk floor (212). Accordingly, the clear cover can be made of hard, durable, shatter-resistant material, such as shatter-resistant glass or polymer materials. The clear cover, and other components of the housing can be designed with strong, rigid materials that are sufficiently thick to support multiple times the body weight of a large user (214) that will be using the sidewalk (210). Indeed, the housing can be designed to support repeated forces from users jumping on the tile (220), to allow for sufficient durability.

The sensors (232) for the tiles (220) can be proximity sensors, which can sense proximity of the sidewalk users (214). The sensors (232) be sensors that do not distinguish between different sidewalk users (214), such as motion sensors. Such sensors (232) may be used to activate the sidewalk tiles (220) in response to sensing sidewalk users (214) nearby. Thus, the use of the sensors (232) can help to avoid the tiles (220) unnecessarily wasting power when no users (214) are near the tiles (220). For example, the sensors (232) for a tile (220) can produce signals that are transmitted to the controller (260) for the tile (220). The tile system (200) can process such signals and respond by sending command instructions to activate the tile (220). If no such signals are received for a predetermined period of time, the controller (260) can deactivate the tile (220), such as by sending a signal to turn off a display (226) for the tile (220).

The sensors (232) may sense identifying information about the users (214). For example, at least some of the sidewalk users (214) may carry with them a sensed item (252), from which the sensors (232) for the tiles (220) can receive identifying information. As an example, the sensed items (252) may include radio frequency identification (RFID) tags that is each encoded with a different identifier, and each sensor (232) may include a RFID tag reader that is configured to read the identifier from each such tag that is sufficiently close to the sensor (232). As an example, such tags may be secured to the shoes of the sidewalk users (214) (e.g., where a tag is adhered to the person's shoe, includes a clip that clips onto the person's shoe, or includes an aperture through which a person's shoe laces extend to secure the tag). Other personalized sensors could include facial recognition cameras, near-field communications devices, or other types of sensors. For example, a near field communication sensor could sense an individual sidewalk user's sensed item (252) when such an item is tapped against the tile (220). With any such different identification schemes, a sensor (232) can sense an identifier for a sidewalk user (214). The controllers (260) can receive the sensor signals, process such signals, and transmit telemetry data (264) to the tile control system (270). For example, the telemetry data (264) may include identifying data (such as an identification code read from an RFID tag) for a user (214) whose sensed item (252) has just been sensed by a sensor (232).

The tile sensors (232) and sensed items (252) may implement reverse sensing operations. For example, a tile sensor (232) may emit a signal (e.g., a radio frequency signal, a magnetic signal, an audio signal, etc.), which can be detected by the sensed item (252) carried by the user (214) (such as where the sensed item (252) is a mobile computing device such as a smartphone). The sensed item (252) can then send a telemetry signal to the control system (270) via the network (262) with telemetry data (264), which can include an identifier for the sensed item (252) carried by the user (214) and an identifier for the tile (220). As another example, each sidewalk tile (220) may include an RFID tag, and the sensed item (252) may include an RFID tag reader, which can detect the RFID tag and send resulting telemetry data (264) to the control system (270). Such examples can still be considered to include a sensor sensing the presence of the sensed item (252) near the tile (220) and sending the telemetry data (264) to the tile control system (270), as used herein, although the sensing operations may be reversed from what may be performed in other implementations where the sensed item (252) emits a signal that is detected, or the sensed item (252) is a passive item such as a passive RFID tag.

The tile control system (270) can be a computer system with one or more computer devices that includes computer readable instructions for receiving and processing the telemetry data (264), and responding by generating and sending command instruction data (272). The command instruction data (272) can include computer-readable commands directed to the tile controllers (260) with the tile control system (270) and the controllers (260) being programmed to generate and to process and understand the commands formatted according to a protocol. The tile control system (270) can store user profiles (274), which are sets of computer-readable data corresponding to each of the sidewalk users (214) (or possibly to a group of such users (214)). The tile control system (270) can also include control rules (276), which can be computer-readable instructions that dictate details of the generating, and possibly sending of the command instruction data (272) to the controllers (260).

The tile control system (270) can further include an administrator client device (278), which can be configured to receive input from an administrator user (280) to dictate how the tile control system (270) is to control the tiles (220). For example, the tile control system (270) can process input from the administrator client device (278) to modify the control rules (276) as dictated by such input. The administrator client device (278) may present user interface features to assist the administrator user (280) in providing input to control the tile control system (270). For example, such an interface may include a display of a geographic map of sidewalks in a city using a geographic information system, which can include icons that each represents a sidewalk tile (220) or group of sidewalk tiles (220). Such an interface may also depict how many users are utilizing a sidewalk (210) at a given time, and in which direction they are traveling. Such data can be derived from the telemetry data (264). For example, such telemetry data (264) can include an identifier for a user and an identifier for a tile (or for a sensor), and a time when the user was at that tile (220) (or group of tiles (220)). Using the sequence of the user's presence at particular tiles, the control system (270) can infer a direction travel of the particular user (for example, as indicated by the direction of movement of a sensed item (252) corresponding to a particular user's user profile (274)).

The tile control system (270) may also communicate with computerized data services (290) to retrieve data that can be used by the tile control system (270) in generating the command instruction data (272) for the tiles (220). For example, the tile control system (270) may retrieve personalized data (292) from the data services (290). This personalized data (292) is specific to a particular user profile (274) for a sidewalk user (214), or to a particular group of user profiles (274) and/or sidewalk users (214). For example, the personalized data (292) may include data indicating a destination for a particular user profile (274) of a sidewalk user (214), or personalized data (292) may include data indicating calendar entries for a digital calendar of a particular user profile (274) of a sidewalk user (214). The tile control system (270) may retrieve context data (294) from the data services (290), with the context data (294) being data that provides context for an interaction between a sidewalk tile (220) and a sidewalk user (214). For example, the context data (294) may be data regarding places of interest or events near the tiles (220). The tile control system (270) may retrieve general content data (296), which is data that provides content to be presented by one or more of the tiles (220) but is not personalized data (292). Examples of such general content data (296) include visual art to be generally displayed, messages to be displayed to provide instructions to sidewalk users (214), graphical and/or textual data to be displayed for a game that is generally applicable to the sidewalk users (214), and/or other content data. Personalized data (292), context data (294), and general content data (296) may also be provided in other ways, such as from client devices of sidewalk users (214), and/or from administrator client devices (278).

B. Examples of Uses of the Computerized Sidewalk Tile System

The computerized sidewalk tile system (200) may be used in different ways that involve the tile control system (270) sending command instruction data (272), which commands the controllers (260) to present data to the sidewalk users (214) via output devices (222) in the sidewalk tiles (220).

In one example, the computerized sidewalk tile system (200) can direct general traffic of sidewalk users (214) on the sidewalk (210). For example, the tile control system (270) can generate and send command instruction data (272), instructing the controllers (260) to indicate a particular direction of travel along a lane (298) of the sidewalk floor (212). The controllers (260) can process the command instruction data (272) and send signals to the output devices (222) of the tiles (220), commanding the output devices (222) to present instructions to the sidewalk users (214) as to the direction of travel. For example, each tile (220) may display an arrow, indicating the direction of travel, or a group of the sidewalk tiles (220) may each display part of the arrow, so that the arrow is formed by the displays of the group of tiles (220), with the displayed arrow being larger than a single tile (220).

The tile control system (270) can send subsequent command instruction data (272) to indicate changes in the direction of travel. For example, this may be done according to a set schedule (such as a first direction for a lane (298) in the morning when more sidewalk users (214) are typically moving in the first direction, an opposite second direction in the evening when more sidewalk users (214) are typically moving in the second direction, and allowing either direction at other times of day). The schedule may be set by input from an administrator client device (278). At least a portion of the schedule may be set in response to context data (294), such as context data indicating that an event is occurring near the sidewalk (210). For example, the tile control system (270) may command the tiles (220) to dictate that sidewalk users (214) travel in a first direction in sidewalk lane (298) prior to the beginning of a large concert near the sidewalk (210) (leading toward the concert), and in a second opposite direction in the sidewalk lane (298) after the end of the concert (leading away from the concert).

As another example, changes in the direction of travel in a sidewalk lane (298) may be indicated as a response to how many users are moving in a particular direction. For example, the telemetry data (264) may be processed by the tile control system (270) to determine that many more sidewalk users (214) are traveling in a first direction (such as by determining that many more sensed items (252) are traveling in the first direction) at a time when the sidewalk tiles (220) are allowing travel in either direction for a particular sidewalk lane (298). In such a scenario, the tile control system (270) may respond to the processing of the telemetry data (264) by sending command instruction data (272), commanding the tiles (220) to change their outputs to indicate the second direction for that sidewalk lane (298). Note that such a change may not be done immediately. For example, the tiles (220) may be commanded to display a warning that the direction will change, for a predetermined period of time before the outputs of the tiles (220) switch to dictate travel in the second direction for that sidewalk lane (298). The telemetry data (264) may be used to provide command instruction data to other systems to make other changes as well, such as automatically changing directions of escalators or moving sidewalks along the sidewalk lane (298). Warnings may be provided by via the outputs of the sidewalk tiles (220) for a predetermined period of time before changing directions of such moving sidewalks and/or escalators.

As another example, the tile control system (270) may command the tiles (220) to provide personal directions to a sidewalk user (214). In such a scenario, the tile control system (270) may determine that a particular user profile (274) has a particular destination. For example, a sidewalk user (214) may ask for the directions via a portable computing device (299), such as a smartphone, from one of the data services (290), which can be a service that provides geographic mapping and directions. When the directions are requested, the sidewalk user's computing device (299) can ask whether directions are to be provided in sidewalk tiles (220). The sidewalk user (214) can provide input, indicating that directions are to be provided by sidewalk tiles (220). In response, the sidewalk user's computing device (299) can send data to the mapping and direction service (290), indicating the user identification, the destination, the current location, and an indicator that directions are to be provided vie sidewalk tiles (220). In response, the mapping and direction service (290) can provide data indicating the user identification, and indicating the directions, to the tile control system (270).

In response, the tile control system (270) can store this information in association with the corresponding user profile (274). When a tile (220) senses the corresponding user's sensed item (252) at a tile (220), user identification for that user's profile (274) can be sent in the telemetry data (264) to the tile control system (270). The tile control system (270)

can respond with command instruction data (272) directed to that tile's controller (260) commanding the tile (220) to present directions using the output device(s) (222) of the tile (220). For example, if the user profile (274) indicates that the user is blind, the directions may be provided audibly from the speaker, as dictated by the command instruction data; otherwise, the directions may be provided by a visual display. As another example, the output device(s) (222) may include one or more mechanical actuators that are operable to provide tactile sensation to users through the tile (220). For example, the mechanical actuator may include an offset motor that is configured to be activated by a signal to produce vibrations, or a solenoid that is operable to produce vibrations. As another example, one or more mechanical actuators may be operable to change a surface texture of the tile (220), such as by raising a pattern of bumps to produce a bumpy surface or lowering the bumps to produce a flat surface. For example, an actuator may change a surface texture to produce different texture patterns to indicate that a user is to turn right, turn left, or go straight. As another example, a tile could vibrate to indicate that a blind user is to turn right or left, with different vibration patterns for different directions. A blind user could sense such vibrations and/or changes in tile texture with a walking stick or shoe. The output device(s) (222) may include multiple different types of devices that may be used to produce any combination of these outputs at the same time, or different types of outputs at different times, depending on the particular sidewalk user (214). When the sidewalk user (214) reaches the next tile on the route, the process can be repeated. In this situation, the directions may be provided in real time, meaning a reasonable amount of time so that a sidewalk user (214) walking at a normal walking pace would still be at the sidewalk tile (220) to receive the directions. In other scenarios, different response speeds may be provided. For example, a longer response time may be utilized for sidewalk tiles (220) near a waiting area of a bus stop. As an example, this may be done where calendar data may be provided on a sidewalk tile for a sidewalk user (214) using similar interactions to those of the personal directions noted above, but with a calendaring data service (290) and with calendar data in the command instruction data (272) for display on a tile (220) for an identified sidewalk user (214).

In situations where the command instruction data (272) includes data that is personal to the sidewalk user (214), privacy issues can be addressed in the computerized tile system (200). For example, with calendar entries, some of the data may be omitted (such as by just providing titles for entries, but not additional descriptive details). A sidewalk user (214) may provide input via a computing device (299) communicating with the tile control system (270), to provide privacy settings to be stored with the corresponding user profile (274). Thus, users may be provided with customized privacy settings for data being presented on the sidewalk tiles (220), because such presentations are likely to be perceived by other sidewalk users (214).

As another example, the output devices (222) of the sidewalk tiles (220) may be utilized for games. For example, for a game where users seek out particular displayed items at particular geographic locations, instead of (or in addition to) displaying those items on personal computing devices (299), the items may be displayed on the sidewalk tiles (220). This may encourage more interaction between sidewalk users (214) in playing the game, and thereby increase the enjoyment of the game. As part of the game, input from the game-playing sidewalk users (214) (such as location data, etc.) may be provided via the sensors (232) and/or via the users' own computing devices (299).

The tiles (220) may also be used for displaying other content, such as visual art and/or advertisements. Indeed, the tile control system (270) may be used to provide personalized advertisements to sidewalk users in a manner similar to how personalized directions or calendar items are provided. The content of such advertisements may align with the current location of the sidewalk user (214), the time of the advertisement's display, and/or with information in the corresponding user profile (274). The tile control system (270) may allow users (214) to control the privacy of data that may be used to provide such personalized advertisements.

The use of the sidewalk tiles (220) is not limited to these examples, and the sidewalk tiles (220) may be used to present data other than the particular types of data discussed above.

III. Computer-Controlled Sidewalk Tile Techniques

Several computer-controlled sidewalk tile techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 4:
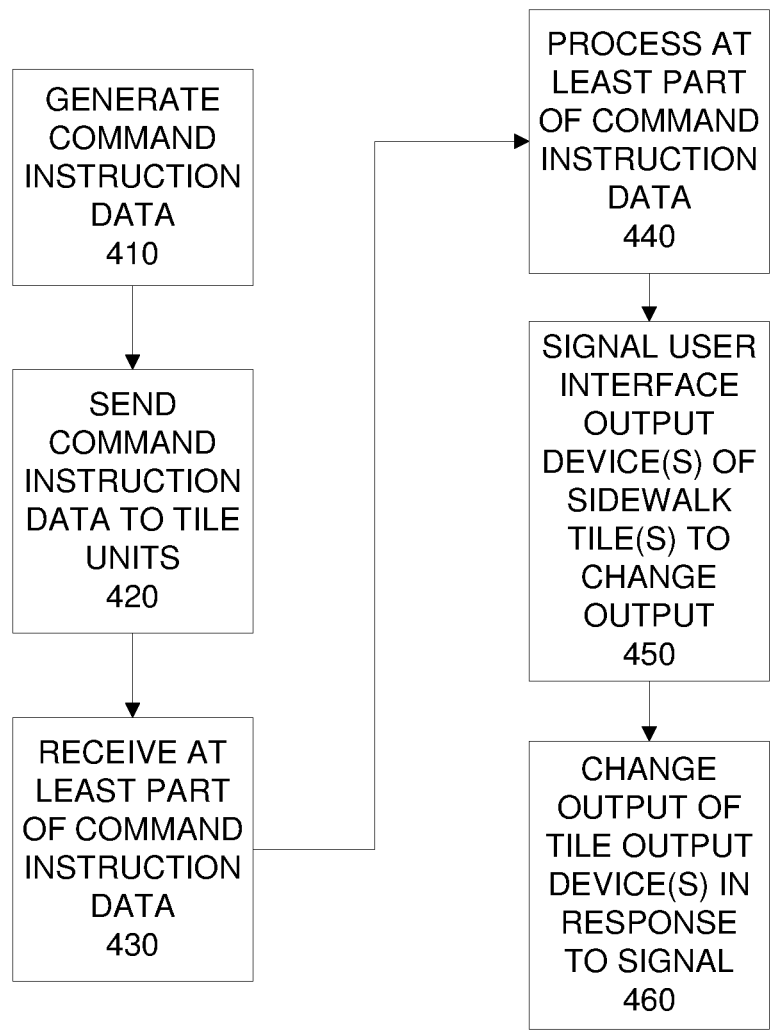
FIG. 4 is a flowchart of a computer-controlled sidewalk tile technique.

Referring to FIG. 4, a computer-controlled sidewalk tile technique will be described. The technique can include generating (410) command instruction data via a computerized control system. The command instruction data can be formatted to prompt a plurality of computerized tile units to change their output. In generating this command instruction data, the computerized control system can access computer-readable rules that can govern the generating of the instruction data. The generating may also take as input data from computerized services, data from an administrative user client device, and/or telemetry data from sidewalk tile units. Such data may be utilized according to the rules, to generate the command instruction data. The technique can further include sending (420) the command instruction data via the computerized control system to one or more of the tile units.

The technique of FIG. 4 can also include receiving (430), via a tile controller of one of the tile units, at least part of the command instruction data. Each tile unit can include such a controller, as well as a tile embedded in a sidewalk floor, with the tile including a user interface output device. The technique can further include processing (440), via the tile controller, the at least part of the command instruction data. Such receiving (430) and processing (440) may be performed via each of multiple tile unit controllers, with each such controller receiving (430) and processing (440) at least part of the command instruction data. The processing (440) of the at least part of the command instruction data can include parsing the at least part of the command instruction data. The controller can be programmed to respond to such parsing by taking actions on commands located during the parsing, with such actions being controlled by stored logic (such as software logic running on hardware, or dedicated hardware logic). Such actions can include signaling (450)

the user interface output device of the tile to change its output. For example, this can include producing a digital or analog display signal and sending such signal to the display, such as a signal encoding one or more frames of graphical data for the display (such as an upwardly-facing screen in a sidewalk tile), and/or producing a digital or analog audio signal and sending such signal to a speaker in a sidewalk tile. The technique of FIG. 4 may also include changing (460) the output of the tile output device in response to the signal, such as displaying a visual image from the signal on a screen and/or playing audio from the signal on a speaker.

The acts discussed above for the technique of FIG. 4 may be performed with one or more of the features discussed in the following paragraphs, in any combination with each other.

The command instruction data can include commands to a set of the plurality of computerized tile units to present instructions to users of the sidewalk floor to change a direction of pedestrian traffic in a pedestrian traffic lane along the sidewalk floor.

A computer system, includes the tile unit and the control system, can include a proximity sensor, with the proximity sensor being configured to detect proximity of an item associated with a computer-readable user profile to the tile unit, and to send telemetry data to the control system. The telemetry data can indicate the proximity of the item to the tile unit. The acts of the computerized control system can include responding to a telemetry data set including the telemetry data by sending the command instruction data to a set of one or more of the tiles, wherein the command instruction data can include commands to a set of the computerized tile units to present instructions to users of the one or more sidewalk floors to change a direction of pedestrian traffic in a pedestrian traffic lane along one of the sidewalk floor(s). The telemetry data may identify the item, where the computerized control system can be configured to respond to a telemetry data set including the telemetry data by the generating and the sending of the command instruction data to the tile unit, with the at least part of the command instruction data including at least one command to present personalized content that is personalized to the identified item. The generating of the command instruction data can include retrieving personalized data from a computer service that is separate from the computerized control system, and including the retrieved personalized data in the command instruction data. In one implementation, the command instruction data can be initial command instruction data, and the technique can further include the following: generating modified command instruction data in response to receiving and processing a telemetry data set including the telemetry data, with the modified command instruction data being formatted to prompt a plurality of computerized tile units to change their output, and with the modified command instruction data being different from the initial command instruction data; and sending the modified command instruction data to a set of the computerized tile units. The sending of the modified command instruction data is performed as a real time response to the telemetry data set. The item may include a computer chip for detection, such as a radio frequency identification tag, which can be identified with a sensor that includes hardware that is configured to perform radio frequency identification.

The command instruction data can include commands to the plurality of computerized tile units to present instructions to users of the sidewalk floor to change a direction of pedestrian traffic in a pedestrian traffic lane along the sidewalk floor. This may be done in response to telemetry data, as discussed above, as part of a set schedule, or as a response to input from an administrative user at an administrator client device.

The command instruction data may include content for a game, and/or artistic content.

The sidewalk floor may be entirely outdoors, partially indoors and partially outdoors, or entirely indoors.

As noted above, the command instruction data can include commands to a set of the computerized tile units to present instructions to users of one or more sidewalk floors to change a direction of pedestrian traffic in a pedestrian traffic lane along one of the one or more sidewalk floors. The computerized control system can respond to sidewalk tile telemetry data by the sending of the command instruction data, with the command instruction data including the commands to the set of the computerized tile units to present instructions to users of the one or more sidewalk floors to change a direction of pedestrian traffic in a pedestrian traffic lane along one of the one or more sidewalk floors. Sidewalk tile telemetry data can identify an item, where the computerized control system can respond to the sidewalk tile telemetry data by the generating and the sending of the command instruction data, with the command instruction data including at least one command to present personalized content that is personalized to the identified item (such as where it is personalized to a profile that corresponds to the item, even if the profile may also correspond to other items—such as where the profile is for a user group or where a user has multiple sensed items). The generating of the command instruction data can include retrieving personalized data from a computer service that is separate from the computerized control system, and including the retrieved personalized data in the command instruction data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
 a computerized control system comprising at least one processor and memory having instructions stored thereon that when executed by at least one processor cause at least one processor to perform acts comprising:
  generating command instruction data, with the command instruction data being formatted to prompt a computerized tile unit to change its output; and
  sending the command instruction data to the computerized tile unit; and
 a plurality of computerized tile units connected to the computerized control system, with the plurality of computerized tile units comprising the computerized tile unit, and with the computerized tile unit comprising:
  a tile embedded in a sidewalk floor, with the tile comprising a user interface output device; and
  a tile controller connected to the user interface output device, with the tile controller comprising computer hardware having instructions stored thereon that when executed to perform acts comprising:
   receiving at least part of the command instruction data from the computerized control system;
   processing the at least part of the command instruction data; and in response to the processing of the at least part of the command instruction data, signaling the user interface output device of the tile to change its output.

2. The computer system of claim 1, wherein the command instruction data comprises commands to a set of the plurality of computerized tile units to present instructions to users of the sidewalk floor to change a direction of pedestrian traffic in a pedestrian traffic lane along the sidewalk floor.

3. The computer system of claim 1, wherein the computer system comprises a proximity sensor, with the proximity sensor being configured to detect proximity of an item associated with a computer-readable user profile to the tile unit, and to send telemetry data to the control system, with the telemetry data indicating the proximity of the item to the tile unit.

4. The computer system of claim 3, wherein the acts of the computerized control system comprise responding to a telemetry data set comprising the telemetry data by sending the command instruction data to a set of one or more of the tiles, with the command instruction data comprising commands to a set of the computerized tile units to present instructions to users of the one or more sidewalk floors to change a direction of pedestrian traffic in a pedestrian traffic lane along one of the one or more sidewalk floors.

5. The computer system of claim 3, wherein the telemetry data identifies the item, wherein the computerized control system is configured to respond to a telemetry data set comprising the telemetry data by the generating and the sending of the command instruction data to the tile unit, with the at least part of the command instruction data comprising at least one command to present personalized content that is personalized to the identified item.

6. The computer system of claim 5, wherein the generating of the command instruction data comprises retrieving personalized data from a computer service that is separate from the computerized control system, and including the retrieved personalized data in the command instruction data.

7. The computer system of claim 3, wherein the telemetry data identifies the item.

8. The computer system of claim 3, wherein the item comprises a computer chip.

9. The computer system of claim 3, wherein the command instruction data is initial command instruction data, and wherein the acts of the control system comprise:
generating modified command instruction data in response to receiving and processing a telemetry data set comprising the telemetry data, with the modified command instruction data being formatted to prompt a plurality of computerized tile units to change their output, and with the modified command instruction data being different from the initial command instruction data; and
sending the modified command instruction data to a set of the computerized tile units.

10. The computer system of claim 9, wherein the sending of the modified command instruction data is performed as a real time response to the telemetry data set.

11. The computer system of claim 1, wherein the command instruction data comprises content for a game.

12. The computer system of claim 1, wherein at least a portion of the sidewalk floor is indoors.

13. A computer-implemented method, comprising:
generating command instruction data via a computerized control system, with the command instruction data being formatted to prompt a plurality of computerized tile units to change their output;
sending the command instruction data from the computerized control system to the computerized tile units, with each of the tile units comprising a tile controller connected to one or more tiles embedded in one or more sidewalk floors, and with each of the tiles comprising a user interface output device;
receiving, via a tile controller of a tile unit of the one or more tile units, at least part of the command instruction data from the computerized control system;
processing the at least part of the command instruction data via the tile controller;
in response to the processing of the at least part of the command instruction data, signaling via the tile controller, the user interface output device of the tile to change its output; and
changing the output of the user interface output device of the tile in response to the signaling from the tile controller.

14. The method of claim 13, wherein the command instruction data comprises commands to a set of the plurality of computerized tile units to present instructions to users of the one or more sidewalk floors to change a direction of pedestrian traffic in a pedestrian traffic lane along one of the one or more sidewalk floors.

15. The method of claim 14, wherein the computerized control system responds to sidewalk tile telemetry data by the sending of the command instruction data, with the command instruction data comprising commands to a set of the computerized tile units to present instructions to users of the one or more sidewalk floors to change a direction of pedestrian traffic in a pedestrian traffic lane along one of the one or more sidewalk floors.

16. The method of claim 14, wherein sidewalk tile telemetry data identifies an item, wherein the computerized control system responds to the sidewalk tile telemetry data by the generating and the sending of the command instruction data, with the command instruction data comprising at least one command to present personalized content that is personalized to the identified item.

17. The method of claim 16, wherein the generating of the command instruction data comprises retrieving personalized data from a computer service that is separate from the computerized control system, and including the retrieved personalized data in the command instruction data.

18. The method of claim 13, wherein the command instruction data comprises content for a game.

19. One or more computer-readable memory having computer-executable instructions embodied thereon that, when executed by at least one processor, cause at least one processor to perform acts comprising:
generating command instruction data via a computerized control system, with the command instruction data being formatted to prompt a plurality of computerized tile units to change their output;
sending the command instruction data from the computerized control system to the computerized tile units, with each of the tile units comprising a tile controller connected to one or more tiles embedded in one or more sidewalk floors, and with each of the tiles comprising a computer display;
receiving, via a tile controller of a tile unit of the one or more tile units, at least part of the command instruction data from the computerized control system;
processing the at least part of the command instruction data via a tile controller of the tile unit;

in response to the processing of the at least part of the command instruction data, signaling via the tile controller, a computer display of a tile in the tile unit to change its output; and changing the output of the computer display in response to the signaling from the tile controller.

20. The one or more computer-readable memory of claim 19, wherein the command instruction data comprises commands to the plurality of computerized tile units to present instructions to users of the one or more sidewalk floors to change a direction of pedestrian traffic in a pedestrian traffic lane along at least one of the one or more sidewalk floors.

* * * * *